United States Patent [19]

Minagawa et al.

[11] Patent Number: 4,689,277

[45] Date of Patent: Aug. 25, 1987

[54] RARE EARTH PHOSPHOR AND RADIOGRAPHIC IMAGE CONVERSION SCREEN

[75] Inventors: Yukinori Minagawa, Ebina; Minoru Tanaka; Keiko Matsuo, both of Kawasaki; Etsuo Shimizu, Tokyo, all of Japan

[73] Assignees: Mitsubishi Chemical Industries Ltd.; Kasei Optonix, Ltd., both of Tokyo, Japan

[21] Appl. No.: 804,767

[22] Filed: Dec. 5, 1985

[30] Foreign Application Priority Data

Dec. 5, 1984 [JP] Japan .................. 59-257107
Dec. 28, 1984 [JP] Japan .................. 59-279386
Dec. 28, 1984 [JP] Japan .................. 59-279387
Sep. 13, 1985 [JP] Japan .................. 60-203055

[51] Int. Cl.⁴ .............. C09K 11/06; C09K 11/475; G01T 1/00
[52] U.S. Cl. .............. 428/690; 250/483.1; 252/301.36; 428/917
[58] Field of Search .......... 250/483.1; 428/917, 428/690, 691; 252/301.36

[56] References Cited

U.S. PATENT DOCUMENTS

4,360,571 11/1982 Rabatin ................ 428/691
4,415,471 11/1983 Degenhardt .......... 428/691 X
4,537,826 8/1985 Miyamura et al. ..... 428/917 X

FOREIGN PATENT DOCUMENTS

2009101 2/1970 Fed. Rep. of Germany .
2017140 4/1986 United Kingdom .

OTHER PUBLICATIONS

CA 98(22): 180654w; Asahi-Dow.

Primary Examiner—Nancy A. Swisher
Attorney, Agent, or Firm—Oblon, Fisher, Spivak, McClelland & Maier

[57] ABSTRACT

A rare earth phosphor comprising a rare earth oxyhalide phosphor body and cinnamic acid which may have a hydrophobic substituent and which is adhered to or brought in contact with the phosphor body.

14 Claims, 4 Drawing Figures

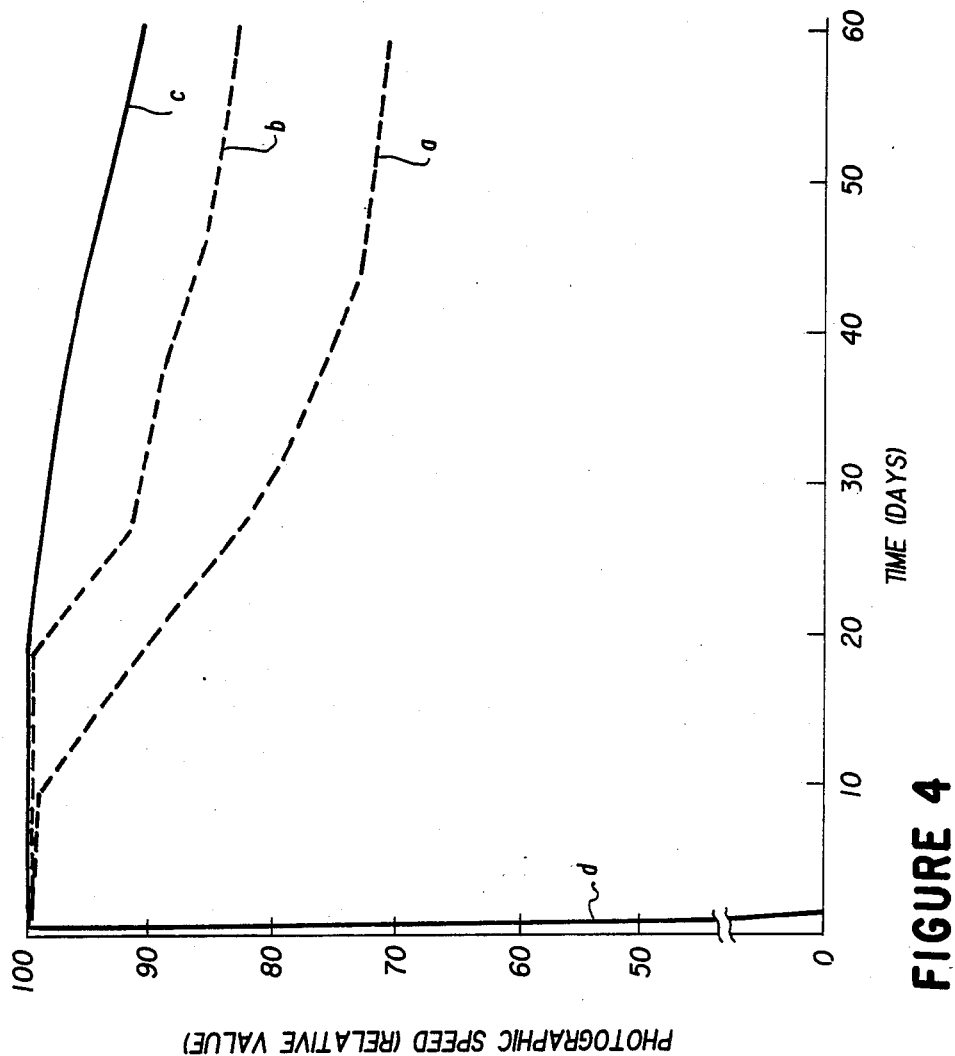

RARE EARTH PHOSPHOR AND RADIOGRAPHIC IMAGE CONVERSION SCREEN

The present invention relates to a rare earth oxyhalide phosphor having improved moisture stability, and to an improvement in the moisture resistance of a radiographic image conversion screen wherein the rare earth oxyhalide phosphor is used for a fluorescent layer.

A rare earth oxyhalide phosphor comprises a rare earth oxyhalide as a matrix and a suitable activator doped thereon, said rare earth oxyhalide being composed of at least one element selected from the group consisting of gadolinium (Gd), lanthanum (La) and yttrium (Y), at least one element selected from the group consisting of bromine (Br) and chlorine (Cl), and oxygen. Such a rare earth oxyhalide phosphor usually emits high luminance visible or near visible light when excited by energy rays such as X-rays, $\gamma$-rays, electron rays, ultraviolet rays or neutron rays. Accordingly, it is useful as a phosphor for X-ray image conversion screens, as a phosphor for $\gamma$-ray image conversion screens, as a phosphor for neutron ray image conversion screens or as a phosphor for cathode ray tubes.

However, the rare earth oxyhalide phosphor has low moisture resistance and has a drawback that, when exposed to the air, it absorbs moisture and undergoes hydrolysis, whereby the luminance tends to deteriorate. As the hydrolysis proceeds, the phosphor tends to show no luminance eventually. FIG. 3 is a graph showing the relation between the weight increase and the luminance deterioration due to the hydrolysis when a gadolinium oxybromide phosphor activated with cerium (GdOBr:Ce) was held at 60° C. under a relative humidity of 80%. In the Figure, the abscissa indicates the time (min) for maintenance under the above condition, the ordinate at the left hand side indicates the weight increase (%), and the ordinate at the right hand side indicates the relative luminance (%).

Accordingly, it is very much desired to improve the moisture resistance for utilization of the rare earth oxyhalide phosphor. There have been some proposals as disclosed in Japanese Unexamined Patent Publications No. 131987/1978 and No. 75185/1978.

The present inventors have previously proposed a method for improving the moisture resistance of a rare earth oxyhalide phosphor by the treatment with various types of aqueous solutions (Japanese Patent Application Nos. 184824/1984, 195554/1984 and 198207/1984).

As is well known, the radiographic image conversion screen as represented by an intensifying screen, is used in face contact with a film for radiation photography, and a radiation of X-rays, $\gamma$-rays or neutron rays passed through an object is irradiated thereon, whereupon the radiation is converted to light, and the film is exposed by the light, and thus the speed of the film to the radiation is thereby improved. Basically, the intensifying screen of this type comprises a support made of paper, plastic or the like and a fluorescent layer formed on one side of the support. The fluorescent layer is composed of a binder resin and phosphor particles dispersed in the binder, which are capable of emitting high luminance when excited by radiation. The surface of the fluorescent layer (the surface opposite to the support side) is usually protected by a thin transparent protective film such as a polyethylene terephthalate film, a polymethacrylate film or a cellulose acetate film to prevent the abrasion of the fluorescent layer. The intensifying screen is required to have a high speed and good photographic image quality such as sharpness and granularity. Such properties are, in many cases, largely dependent on the properties of the phosphor constituting the fluorescent layer.

It is known that rare earth oxyhalide phosphors wherein an oxyhalide of a rare earth element such as lanthanum (La), gadolinium (Gd) or yttrium (Y) is activated by terbium (Tb), thulium (Tm) or cerium (Ce), show greater radiation absorption than the $CaWO_4$ phosphors or the $BaSO_4:Pb$ phosphors which used to be employed as phosphors for conventional intensifying screens, and emit high luminance when excited by radiation. Among them, intensifying screens wherein a LaOBr:Tb phosphor or a LaOBr:Tm phosphor is used for the fluorescent layers, are practically used as high speed type intensifying screens. However, the rare earth oxyhalide phosphors are highly hygroscopic, and the intensifying screens employing such phosphors have a drawback that when left to stand for a long period of time, the rare earth oxyhalide phosphors in the fluorescent layers gradually absorb moisture from the air and undergo hydrolysis, whereby the speed deteriorates substantially. As mentioned above, there have been some proposals to improve the moisture resistance of the rare earth oxyhalide phosphors. However, even when rare earth oxyhalide phosphors treated for the improvement of moisture resistance in accordance with these proposals, are used for intensifying screens, the deterioration of the speed when left to stand for a long period of time, can not substantially be prevented. Therefore, a further improvement has been strongly desired.

The present inventors have conducted research on the binder resins and the additives to be incorporated thereto for the preparation of fluorescent layers for intensifying screens wherein rare earth oxyhalide phosphors are used. As a result, they have found it possible to improve the moisture resistance of the intensifying screens and to prevent the deterioration of the speed with time by incorporating cinnamic acid into the fluorescent layers of the intensifying screens either by dissolving cinnamic acid in the phosphor coating solution comprising a binder resin and an organic solvent, or by using a rare earth oxyhalide phosphor to which cinnamic acid is preliminarily adhered. The present invention is based on this discovery.

It is an object of the present invention to provide a rare earth oxyhalide phosphor having extremely good moisture resistance by a method which is entirely different from the above-mentioned conventional processes.

Another object of the present invention is to provide a radiographic image conversion screen employing a rare earth oxyhalide phosphor for the fluorescent layer and having improved moisture resistance than the conventional screens.

The present invention provides a rare earth phosphor comprising a rare earth oxyhalide phosphor body and cinnamic acid which may have a hydrophobic substituent and which is adhered to or brought in contact with the phosphor body.

Further, the present invention provides also a radiographic image conversion screen comprising a support and a fluorescent layer formed on the support and composed essentially of a rare earth oxyhalide phosphor dispersed in a binder resin, wherein the fluorescent layer contains cinnamic acid which may have a hydrophobic substituent.

In the accompanying drawings.

Figure 3:
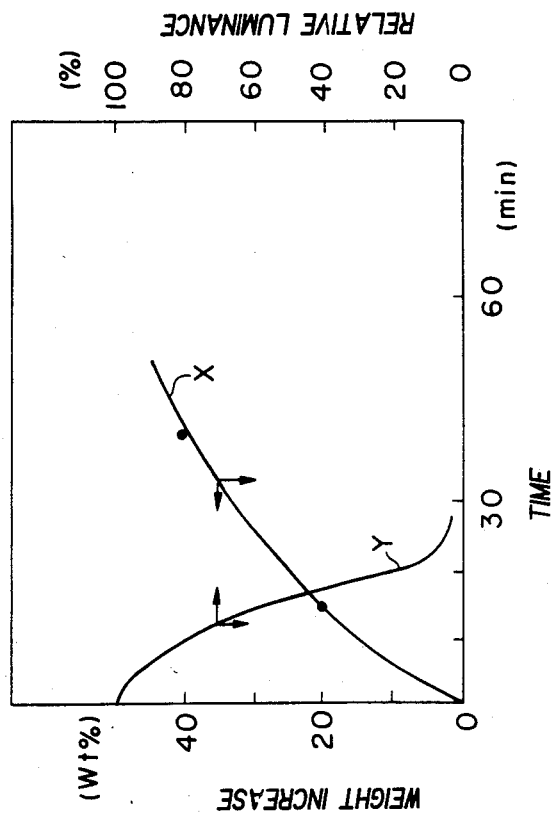

FIG. 3 is a graph illustrating the changes with time in the weight and luminance of the phosphor, when a phosphor of gadolinium oxybromide activated by cerium (GdOBr:Ce) was maintained in a constant temperature and constant humidity chamber at a temperature of 60° C. under a relative humidity of 80%. In the Figure, curve X represents the change (increase) in the weight, and curve Y indicates the change (decrease) in the luminance.

FIG. 4 is a graph illustrating the change with time in the photographic speed of the intensifying screen, when an intensifying screen composed of a $(La_{0.5},Gd_{0.5})OBr:Ce$ phosphor of the present invention is maintained in a constant temperature and constant humidity chamber at a temperature of 60° C. under a relative humidity of 80%.

Now, the present invention will be described in further detail with reference to the preferred embodiments.

As mentioned above, the rare earth oxyhalide phosphor of the present invention comprises a rare earth oxyhalide as a matrix and a suitable activator doped thereon, the rare earth oxyhalide being composed of at least one element selected from the group consisting of gadolinium (Gd), lanthanum (La) and yttrium (Y), at least one halogen selected from the group consisting of bromine (Br) and chlorine (Cl) and oxygen. As the activator, cerium (Ce), terbium (Tb) or thulium (Tm) may be employed. The particle size of the phosphor particles is usually from a few micrometer to some ten micrometer. Preferred for the present invention is a phosphor composed of gadolinium oxybromide as the essential element for the matrix or a phosphor containing cerium as the activator. Particularly preferred is a phosphor of gadolinium oxybromide type activated by cerium. The phosphor of this type has poor moisture resistance in spite of its excellent fluorescent properties, and its use is substantially limited.

According to the present invention, the moisture resistance can be improved simply by contacting these rare earth oxyhalide phosphors with cinnamic acid in a liquid phase. Further, instead of cinnamic acid, a substituted cinnamic acid having a hydrophobic substituent such as an alkyl group e.g. a methyl group or an ethyl group, or an alkoxy group e.g. a methoxy group or an ethoxy group, may be employed. For instance, p-ethylphenylacrylic acid, p-methylphenylacrylic acid or α-methylphenylacrylic acid may be employed. For the moisture resistant treatment of the present invention, it is usually preferred to use cinnamic acid in the form of a solution. It is common to employ a lower alcohol such as methanol or ethanol as the solvent. However, other organic solvents which are capable of dissolving cinnamic acid may also be employed.

The concentration of cinnamic acid in the solution is usually at least 0.1 mol/liter. It is usual to employ a highly concentrated solution having a concentration of from 1 mol/liter to a level close to a saturated solution. The moisture resistant treatment can simply be accomplished by introducing phosphor particles into the solution of cinnamic acid and thoroughly stirring the mixture for adequate contact, followed by filtration and drying. The treating time may optionally be selected, and is usually from 10 minutes to a few hours. The treating temperature may usually be room temperature, but may be higher or lower than room temperture. The drying after the contacting treatment is usually carried out at room temperature, but if desired, may be conducted at a high temperature as high as at least the melting point of cinnamic acid.

For the moisture resistant treatment of the phosphor particles according to the present invention, it is preferred to apply a suitable pretreatment for moisture resistance, for instance, by preliminarily contacting an aqueous solution containing at least one type of ions selected from the group consisting of fluorine ions, phosphate ions, carbonate ions and sulfuric ions, to the phosphor particles, whereby the effectiveness can further be improved. For this pretreatment, as an aqueous solution containing fluorine ions, for instance, an aqueous alkaline solution containing a fluoride may be employed. Any fluoride may be employed as the fluoride in the aqueous alkaline solution. However, it is common to employ an alkali metal salt of hydrogen fluoride such as sodium fluoride, potassium fluoride or cesium fluoride, or an ammonium salt. As the alkali in the aqueous solution, any alkali may be employed, but it is common to employ sodium hydroxide or potassium hydroxide.

The concentration of the fluoride in the aqueous alkaline solution is usually within a range of from 0.001 mol/liter to the solubility of the respective compounds. Extremely good results can be obtained especially when a solution having a concentration of from 0.006 mol/liter to a high concentration close to the solubility is employed. Further, the ratio (F/OH) of the dissolved fluoride concentration (calculated as F) to the hydroxy ion concentration in the aqueous alkaline solution is preferably at least 1. The treating time is usually optionally selected within a range of from 10 minutes to a few hours depending upon various conditions. The treating temperature may optionally be determined, but may usually be room temperature. After the treatment, the phosphor is collected by filtration and dried. This drying is conducted within a temperature range of from room temperature to 100° C.

The pretreatment with an aqueous solution containing phosphate ions may be conducted by stirring the above-mentioned rare earth oxyhalide phosphor particles in an aqueous solution containing phosphate ions. As the aqueous solution containing phosphate ions, it is usual to employ an aqueous solution to which a phosphate is dissolved. As such a phosphate, any phosphate may be employed, but it is usual to employ an alkali metal salt of phosphoric acid such as trisodium phosphate or disodium hydrogen phosphate. The concentration of the phosphate in the aqueous solution is usually within a range of from 0.001 mol/liter to a level of a saturated solution of the particular phosphate.

The treatment with the aqueous phosphate solution is conducted usually by stirring phosphor particles with from 10 times to 50 times by weight of an aqueous phosphate solution. The treating time is optionally selected within a range of from 10 minutes to a few hours. The treating temperature may usually be room temperature.

For the moisture resistant treatment of the phosphor particles according to the present invention, the effectiveness can further be improved by a combination of the pretreatment with the phosphate ion-containing aqueous solution and the treatment with an aqueous solution containing fluorine ions. The treatment with an aqueous solution containing fluorine ions may be conducted before, after or at the same time as the treatment with the aqueous solution containing phosphate ions. For the convenience in operation, it is preferred to conduct the treatments at the same time.

For instance, when fluorine ions are incorporated into an aqueous solution of a phosphate, the concentration of the fluoride in the aqueous phosphate solution is usually within a range of from 0.01 mol/liter to a level of the saturated solubility of the particular fluoride. It is particularly preferred to employ a solution having a concentration of from 0.03 mol/liter to a high concentration close to the saturated solubility.

The pretreatment with an aqueous solution containing carbonate ions and/or sulfate ions, may be conducted by stirring the above-mentioned rare earth oxyhalide phosphor particles in an aqueous solution containing carbonate ions and/or sulfate ions.

As the aqueous solution containing carbonate ions, it is common to employ an aqueous solution to which a carbonate is dissolved. As the carbonate, any carbonate may be employed, but it is common to employ an alkali metal salt of carbonic acid such as trisodium carbonate or sodium hydrogen carbonate, or an ammonium salt of carbonic acid such as ammonium hydrogen carbonate. The concentration of a carbonate in the aqueous solution is usually within a range of from 0.001 mol/liter to a level of the saturated solubility of the particular carbonate.

As the aqueous solution containing sulfate ions, it is usual to employ an aqueous solution in which a sulfate is dissolved. As such a sulfate, any sulfate may be employed, but a bivalent metal salt of sulfuric acid such as beryllium sulfate is particularly recommended. The concentration of the sulfate in the aqueous solution is usually within a range of from 0.001 mol/liter to a level of the saturated solubility of the particular sulfate.

The treatment with the aqueous carbonate solution and/or the aqueous sulfate solution, is conducted usually by stirring phosphor particles with from 10 to 50 times by weight of the above-mentioned aqueous solution. The treating time is optionally selected within a range of from 10 minutes to a few hours. The treating temperature may usually be room temperature.

For the moisture resistant treatment of the phosphor particles according to the present invention, the effectiveness can further be improved by a combination of the pretreatment with the aqueous solution containing carbonate ions and/or sulfate ions and treatment with an aqueous solution containing fluorine ions. The treatment with the aqueous solution containing fluorine ions may be conducted before, after or at the same time as the treatment with an aqueous solution containing carbonate ions and/or sulfate ions. However, from the convenience in operation, it is preferred to conduct the treatments simultaneously. For instance, when fluorine ions are incorporated into an aqueous solution for the pretreatment, the concentration of a fluoride in the aqueous solution is selected within a range of from 0.1 mol/liter to a level of the saturated solubility of the particular fluoride, and it is particularly preferred to employ a solution having a concentration of from 0.3 mol/liter to a high level close to the saturated solubility.

After the above treatment, the phosphor particles are collected by filtration and then subjected to the treatment with the above-mentioned cinnamic acid.

Thus, a rare earth oxyhalide phosphor treated for moisture resistance according to the present invention is obtained.

Figure 1:
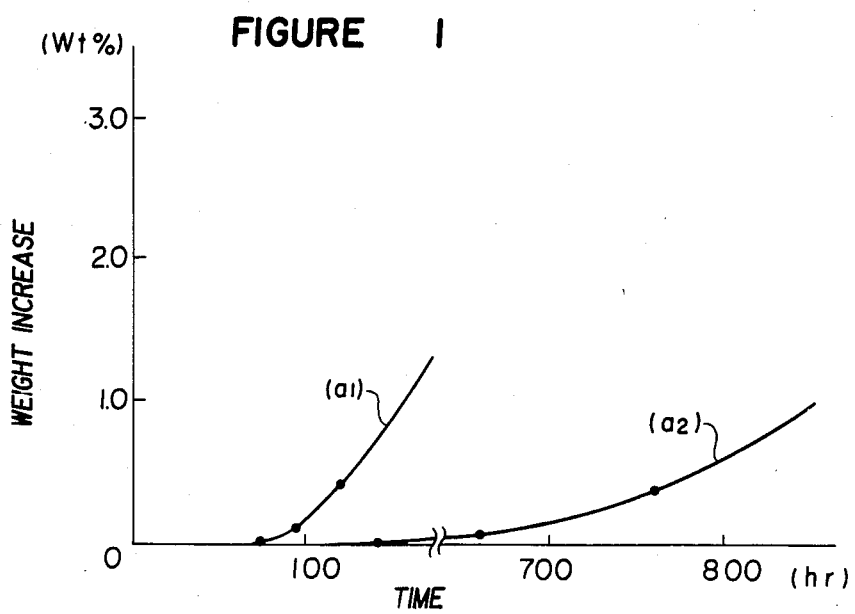
FIG. 1 is a graph showing the results of Examples of the present invention, wherein the abscissa indicates the time (hr.) for the accelerated deterioration test and the ordinate indicates the weight increase (wt %). In this Figure, (a₁) and (a₂) show the results obtained by GdOBr:Ce phosphors treated by the present invention.

The moisture resistance properties of the rare earth oxyhalide phosphors obtained by the treatment of the present invention are shown in FIG. 1. FIG. 1 is a view showing the relation between the time (hr) for the accelerated deterioration test and the weight increase (wt %), and clearly shows that the products of the present invention have excellent moisture resistance as compared with the conventional product shown in FIG. 3.

The reason for the improvement in the moisture resistance of the phosphor particles by the treatment according to the present invention is believed that cinnamic acid is bonded to the surface of the phosphor particles treated with the aqueous solution containing the above-mentioned ions, by some force, whereby the surface is made hydrophobic. Further, since such effectiveness is not obtainable by a usual fatty acid or benzoic acid, or an ester of cinnamic acid, it is believed that the characteristic in the structure of the cinnamic acid that an unsaturated carboxylic acid having a certain length is bonded to a phenyl group, somewhat contributes to the hydrophobic nature of the phosphor surface.

Now, the radiographic image conversion screen of the present invention will be described with reference to an intensifying screen as its representative. For the preparation of an intensifying screen, predetermined amcunts of a rare earth oxyhalide phosphor, a binder resin and cinnamic acid are mixed, and an organic solvent is added thereto in a proper amount to prepare a phosphor coating solution having an optimum viscosity, and this phosphor coating solution is coated on a support made of e.g. paper or plastic by means of e.g. a doctor blade or a roll coater, followed by drying, to form a fluorescent layer containing cinnamic acid. Then, if necessary, a protective film for the protection of the fluorescent layer is formed on the fluorescent layer to obtain an intensifying screen. The protective layer is formed either by coating a mixture of proper amounts of an organic solvent and a resin such as polymethacrylate or cellulose acetate having an optimum viscosity on the fluorescent layer as described above, followed by drying, or by laminating a thin film of e.g. polyethylene terephthalate on the fluorescent layer.

As the phosphor used for the fluorescent layer of the intensifying screen of the present invention, the above-mentioned rare earth oxyhalide phosphor is employed. After the preparation, such a rare earth oxyhalide phosphor is washed with e.g. methyl alcohol or ethyl alcohol to dissolve and remove excess halogen elements, and then may be used as it is. However, it is also possible in some cases to further improve the moisture resistance of the resulting intensifying screen by preliminarily applying moisture resistant treatment to the rare earth oxyhalide phosphor by a method wherein a specific soluble inorganic salt is mixed to the rare earth oxyhalide phosphor (see Japanese Unexamined Patent Publication No. 75185/1978), a method wherein a soluble trivalent antimony compound is mixed (see Japanese Unexamined Patent Publication No. 62989/1980) or a method wherein after the above pretreatment, the phosphor is contacted with cinnamic acid in a liquid phase. In the case where cinnamic acid is already deposited on the surface of the rare earth oxyhalide phosphor to be used, for instance, by the preliminary moisture resistant treatment applied by a method of e.g. contacting the rare earth oxyhalide phosphor with cinnamic acid in a liquid phase as mentioned above, the moisture resistance of the resulting intensifying screen can be improved even if cinnamic acid is not added to the phosphor coating solution prepared for the preparation of the fluorescent layer. As the binder resin to be used for the fluorescent layer of the intensifying screen of the present invention, there may be employed any binder resin which has been commonly used for the conventional fluorescent layers, such as nitrocellulose, ethyl cellulose, polyvinyl butyral, polyvinyl acetate, polymethyl methacrylate, a vinyl chloride-vinyl acetate copolymer, polyurethane, cellulose acetate butyrate or polyvinyl alcohol. However, from the viewpoint of the moisture resistance of the resulting intensifying screen, it is particularly preferred to employ cellulose acetate butyrate or polyvinyl butyral among such binders. The optimum amount of cinnamic acid incorporated in the fluorescent layer of the intensifying screen of the present invention varies depending upon the composition of the rare earth oxyhalide phosphor to be used or on the method for the moisture resistant treatment preliminarily applied to the rare earth oxyhalide phosphor. If the amount is less than 0.05% by weight relative to the rare earth oxyhalide phosphor, no substantial improvement in the moisture resistance of the resulting intensifying screen is obtainable. On the other hand, if the amount exceeds 10% by weight, cinnamic acid tends to separate and precipitate on one side of the fluorescent layer when the phosphor coating solution is coated on the support and dried, whereby the adhesion of the fluorescent layer to the protective layer or to the support tends to be poor, and the image quality of the intensifying screen is likely to be poor. Therefore, the content of the cinnamic acid in the fluorescent layer is preferably from 0.05 to 10% by weight relative to the rare earth oxyhalide phosphor. The best results are obtainable when the cinnamic acid content is from 2 to 6% by weight. Instead of cinnamic acid, the above-mentioned substituted cinnamic acid having a hydrophobic substituent may also be employed.

FIG. 4 illustrates the relation between the number of days and the photographic speed of an intensifying screen of the present invention when the intensifying screen employing a $(La_{0.5},Gd_{0.5})OBr:Ce$ phosphor i.e. one of rare earth oxyhalide phosphors, for the fluorescent layer, is held in a constant temperature and constant humidity chamber at a temperature of 60° C. under a relative humidity of 80% (accelerated deterioration test). In FIG. 4, curves (a), (b) and (c) represent, respectively, a case wherein cinnamic acid is contained in the binder resin, and a $(La_{0.5},Gd_{0.5})OBr:Ce$ phosphor was washed with methanol and then immediately formed into an intensifying screen, a case wherein a $(La_{0.5},Gd_{0.5})OBr:Ce$ phosphor was dipped (primary treatment) in an aqueous solution comprising 0.2 mol/liter of $Na_2HPO_4$, 0.2 mol/liter of $KH_2PO_4$ and 5 mol/liter of KF, and then formed into an intensifying screen, and a case wherein a $(La_{0.5},Gd_{0.5})OBr:Ce$ phosphor was dipped (primary treatment) in an aqueous solution comprising 0.2 mol/liter of $Na_2HPO_4$, 0.2 mol/liter of $KH_2PO_4$ and 5 mol/liter of KF, further dipped (secondary treatment) in a methanol solution containing 20% by weight of cinnamic acid, and then formed into an intensifying screen. Further, curve (d) represents a Comparative Example wherein a phosphor coating solution containing no cinnamic acid was prepared by using a $(La_{0.5},Gd_{0.5})OBr:Ce$ phosphor washed with methanol, and an intensifying screen was prepared in the same manner as a conventional method, whereupon the accelerated deterioration test was conducted under the same conditions, and the results were plotted.

It is evident from FIG. 4 that with respect to the intensifying screen employing the $(La_{0.5},Gd_{0.5})OBr:Ce$ phosphor, when no cinnamic acid is incorporated in the fluorescent layer (curve (d)), the hydrolysis upon absorption of water by the phosphor in the fluorescent layer starts immediately after the preparation of the intensifying screen, and upon expiration of one day, the speed drops remarkably to a useless level. Whereas, when cinnamic acid is incorporated in the fluorescent layer (curves (a), (b) and (c)), the deterioration of the speed of the resulting intensifying screen is remarkably suppressed, and the moisture resistance is substantially improved. Further, in the case where cinnamic acid is incorporated in the fluorescent layer, the moisture resistance of the resulting intensifying screen can further be improved by preliminarily applying primary moisture resistant treatment by e.g. the above-mentioned method (curve (b)), or by employing the $(La_{0.5},Gd_{0.5})OBr:Ce$ phosphor treated for the primary moisture resistant treatment and then for the secondary treatment (curve (c)) as compared with the case where the $(La_{0.5},Gd_{0.5})OBr:Ce$ phosphor was not treated for moisture resistance (curve (a)). The degree of the improvement in the moisture resistance varies depending upon the type of the rare earth oxyhalide phosphor to be used. However, as in the case of an intensifying screen employing the $(La_{0.5},Gd_{0.5})OBr:Ce$ phosphor, the moisture resistance of the resulting intensifying screen is remarkably improved by the incorporation of cinnamic acid into the fluorescent layer also in the intensifying screen wherein a rare earth oxyhalide phosphor other than the $(La_{0.5},Gd_{0.5})OBr:Ce$ phosphor is used for the fluorescent layer. Furthermore, the moisture resistance of the intensifying screen can be further improved by subjecting the rare earth oxyhalide phosphor to preliminary moisture resistant treatment.

On the other hand, the effects of the present invention are particularly remarkable for the phosphors having relatively weak moisture resistance among various rare earth oxyhalide phosphors. Accordingly, firstly the combination with a gadolinium phosphor and secondly the combination with lanthanum phosphor exhibit excellent effects. Among such rare earth oxyhalide phosphors, those having a matrix composition of $(La_{1-x},Gd_x)OBr$ (where $0.05 \leq x \leq 0.55$) or $(Y_{1-y},Gd_y)OBr$ (where $0.05 \leq y \leq 0.80$) are superior to the ones composed of La, Gd or Y alone, and their combination with the cinnamic acid according to the present invention exhibits improved effects. The activator in this case may be any one of the above-mentioned activators, but the effects are particularly remarkable when cerium is used as the activator.

Now, the present invention will be described in further detail with reference to Examples. However, it should be understood that the present invention is by no means restricted to these specific Examples.

EXAMPLE 1

2 g of a cerium-activated gadolinium oxybromide (GdOBr:Ce) phosphor was introduced into 25 ml of a methanol solution of cinnamic acid (concentration: 1.3 mol/liter). The mixture was stirred at room temperture for 1 hour and then filtered. The phosphor was dried at room temperature for 1 hour. This phosphor was placed in a constant temperature and constant humidity chamber at 60° C. under a relative humidity of 80%. The change with time of the weight of the phosphor was measured by the accelerated deterioration test under the high temperature and high humidity condition. The time until the weight increase of the phosphor reached 3% (in the case of this phosphor, the luminance lowered about 10% when the weight increased 3%.) was about 5 hours, thus indicating a substantial improvement in the effective life as compared with about 5 minutes (see FIG. 3) in the case of the phosphor not treated by the present invention.

EXAMPLE 2

3.6 g of sodium fluoride was dissolved in 200 ml of a 0.01 N sodium hydroxide aqueous solution, and the solution was filtered. To this solution, 4 g of a cerium-activated gadolinium oxybromide (GdOBr:Ce) phosphor was introduced. The mixture was stirred for 1 hour at room temperature, and then filtered. The phosphor was then introduced into 25 ml of a methanol solution of cinnamic acid (concentration : 1.3 mol/liter). The mixture was stirred at room temperature for 10 minutes, and then filtered. The phosphor thus obtained was dried at room temperature.

In the same manner as in Example 1, this phosphor was placed in a constant temperature and constant humidity chamber at 60° C. under a relative humidity of 80%, and the weight increase was measured. The time required until the weight increase reached 3% was about 30 hours.

EXAMPLE 3

10 g of a cerium-activated gadolinium oxybromide (GdOBr:Ce) phosphor was introduced into 100 ml of an aqueous solution containing 10 mol/liter of potassium fluoride, and stirred at room temperature for 1 hour. The phosphor was collected by filtration, then introduced into 50 ml of water, stirred for 2 minutes and filtered. The phosphor thereby obtained was washed with 25 ml of methanol and then dried in a vacuum dryer under reduced pressure at room temperature for 1 hour. The phosphor thereby obtained was introduced into 25 ml of a methanol solution of cinnamic acid (concentration: 1.3 mol/liter) and stirred at room temperature for 10 minutes. The phosphor was collected by filtration and left to dry at room temperature.

In the same manner as in Exmaple 1, the phosphor thereby obtained was placed in a constant temperature and constant humidity chamber at 60° C. under a relative humidity of 80%, and the weight change was measured. The time required until the weight increase reached 3% was about 110 hours.

EXAMPLE 4

29.0 g of potassium fluoride was added and dissolved in 100 ml of a 0.01 N sodium hydroxide aqueous solution, and the solution was filtered. To this solution, 4 g of a cerium-activated gadolinium oxybromide (GdOBr:Ce) phosphor was introduced, and stirred at room temperature for 1 hour. The phosphor was collected by filtration and introduced into 25 ml of a methanol solution of cinnamic acid (concentration: 1.3 mol/liter), and stirred at room temperature for 10 minutes. The phosphor was collected by filtration and dried at room temperature.

In the same manner as in Example 1, the phosphor thereby obtained was placed in a constant temperature and constant humidity chamber at 60° C. under a relative humidity of 80%, whereby no substantial detectable weight increase was observed even upon expiration of 240 hours.

EXAMPLE 5

An aqueous solution containing 0.2 mol/liter of $(NH_4)_2CO_3$ and an aqueous solution containing 0.2 mol/liter of $NH_4HCO_3$ were mixed in a volume ratio of 6:4 to obtain a buffer solution of pH 9. To 50 ml of this solution, 4 g of a GdOBr:Ce phosphor was added and stirred for 1 hour. To the suspension solution thereby obtained, 50 ml of an aqueous solution containing 5 mol/liter of KF was added and stirred for further 1 hour. The phosphor was collected by filtration and added to 25 ml of a methanol solution containing 1.3 mol/liter of cinnamic acid, and stirred for 10 minutes. The phosphor was collected by filtration and dried at room temperature.

The phosphor thus obtained was subjected to an accelerated deterioration test in a constant temperature and constant humidity chamber at 60° C. under a relative humidity of 80%, whereby the change with time of the weight of the phosphor was measured. The evaluation of the effective life of the phosphor treated for the moisture resistance was made on the basis of the time until the weight increase reached about 3% by weight (the luminance was reduced by about 10%). The effective life of this phosphor was about 100 hours [as shown by curve ($a_1$) in FIG. 1].

The effective life of the non-treated product was about 5 minutes.

EXAMPLE 6

A solution containing 0.2 mol/liter of $Na_2CO_3$ and a solution containing 0.2 mol/liter of $NaHCO_3$ were mixed in a volume ratio of 1:9 to obtain a buffer solution of pH 9. To 100 ml of this solution, 10 g of a GdOBr:Ce phosphor was added, and stirred for 1 hour. To this suspension solution, 100 ml of a solution containing 5 mol/liter of KF was added, and stirred for further 1 hour. The phosphor was collected by filtration under suction, and dried at room temperature for 1 hour. 2 g of the phosphor thereby obtained was added to 25 ml of a methanol solution containing 1.3 mol/liter of cinnamic acid and stirred for 1 hour. The phosphor was collected by filtration and dried for 1 hour.

This phosphor was subjected to an accelerated deterioration test in the same manner as in Example 5, whereby no substantial weight increase was observed even after expiration of 360 hours [as shown by curve ($a_2$) in FIG. 1].

EXAMPLE 7

A GdOBr:Ce phosphor was obtained in the same manner as in Example 6 except that as the aqueous carbonate solution, an aqueous $NH_4HCO_3$ solution was employed. The phosphor was subjected to an accelerated deterioration test in the same manner as in Example 5, whereby no substantial weight increase was observed upon expiration of 400 hours.

EXAMPLE 8

A GdOBr:Ce phosphor was prepared in the same manner as in Example 5 except that as the aqueous solution for the pretreatment, an aqueous $BeSO_4$ solution was used as an aqueous sulfate solution. The phosphor thereby obtained was subjected to an accelerated deterioration test in the same manner as in Example 5, whereby the effective life was about 450 hours.

EXAMPLE 9

2 g of a GdOBr:Ce phosphor was added to 50 ml of an aqueous solution containing 0.2 mol/liter of trisodium phosphate, and stirred for 1 hour. The phosphor was collected by filtration under suction, and then added to 25 ml of a methanol solution containing 1.3 mol/liter of cinnamic acid, and stirred for 30 minutes. The phosphor was collected by filtration under suction, and dried at room temperature for 1 hour.

The phosphor thus obtained was subjected to an accelerated deterioration test in a constant temperature and constant humidity chamber at 60° C. under a relative humidity of 80%, whereby the change with time of the weight of the phosphor was measured. The results are shown by curve ($b_1$) in FIG. 2.

The evaluation of the effective life of the phosphor treated for moisture resistance was made based on the time until the weight increase reached about 3% by weight (the luminance was reduced by about 10%). The effective life of this phosphor was about 70 hours.

The effective life of a non-treated product was about 5 minutes.

EXAMPLE 10

37.0 g of sodium fluoride was added to 1000 ml of water and stirred, and the solid not dissolved was filtered off to obtain an aqueous sodium fluoride solution. To this solution, 5.0 g of trisodium phosphate 12 hydrate was added and stirred. Then, 20 g of a GdOBr:Ce phosphor was added thereto and stirred. The first 1 hour of stirring was conducted by introducing 100 g of glass beads having a diameter of 5 mm in a polyethylene resin bottle and rotating the bottle. Thereafter, only the suspension was transferred to a glass beaker and stirred for 3 hours by a magnetic stirrer, and then the phosphor was separated by filtration under suction. The phosphor was washed with 200 ml of methanol, and then dried at room temperature. 2 g of the phosphor thus obtained was added to 25 ml of an ethanol solution containing 1.3 mol/liter of cinnamic acid, and stirred for 1 hour. The phosphor was collected by filtration and dried at room temperature.

Figure 2:
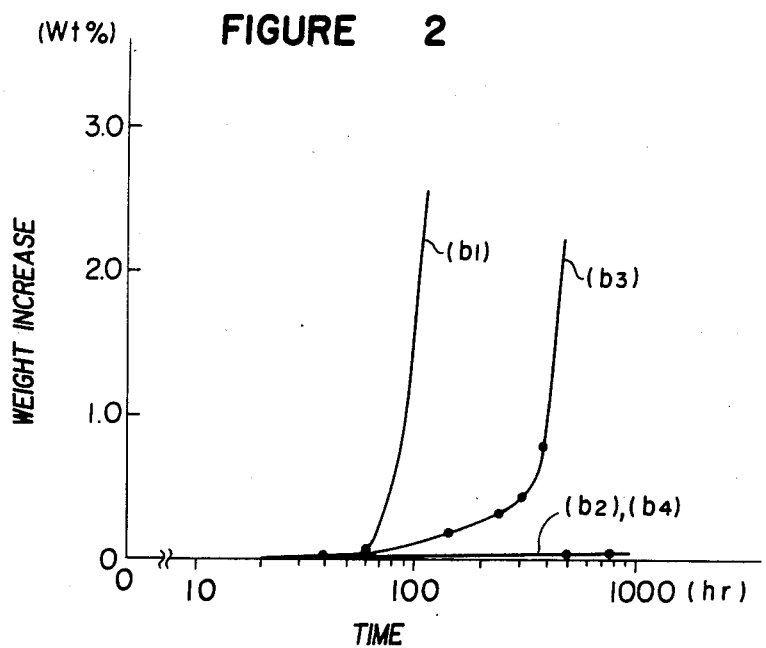
FIG. 2 is a graph showing the results of Examples of the present invention, wherein the abscissa indicates the time (hr.) for the accelerated deterioration test and the ordinate indicates the weight ratio (wt %). In the Figure, (b₁) to (b₄) represent the results of GdOBr:Ce phosphors treated by the present invention in the corresponding Examples, respectively.

The phosphor thus obtained was subjected to an accelerated deterioration test in the same manner as in Example 9, whereby the effective life did not expire even upon expiration of 720 hours, and the weight increase was as small as 0.9% by weight [as shown by curve ($b_2$) in FIG. 2].

EXAMPLE 11

A solution containing 0.2 mol/liter of $KH_2PO_4$ and a solution containing 0.2 mol/liter of $Na_2HPO_4$ were mixed in a volume ratio of 1:2 to obtain a buffer solution of pH 7. To 50 ml of this solution, 4 g of a GdOBr:Ce phosphor was added and stirred for 1 hour. The phosphor was collected by filtration under suction, and added to 25 ml of a methanol solution containing 1 mol/liter of cinnamic acid. The mixture was stirred for 1 hour. The phosphor was collected by filtration under suction, and dried at room temperature for 1 hour.

The phosphor thus obtained was subjected to an accelerated deterioration test in the same manner as in Example 9, whereby the effective life was 240 hours as shown by curve ($b_3$) in FIG. 2].

EXAMPLE 12

A solution containing 0.2 mol/liter of $KH_2PO_4$ and a solution containing 0.2 mol/liter of $Na_2HPO_4$ were mixed in a volume ratio of 1:2 to obtain a buffer solution of pH 7. To 50 ml of this solution, 4 g of a GdOBr:Ce phosphor was added and stirred for 2.5 hours. Then, 10 ml of a solution containing 5 mol/liter of KF was added to the suspension solution, and stirred for further 1 hour. The phosphor was collected by filtration under suction, and then added to 25 ml of a methanol solution containing 1.3 mol/liter of cinnamic acid. The mixture was stirred for 1 hour. The phosphor was collected by filtration under suction, and dried at room temperature for 1 hour.

The phosphor thus obtained was subjected to an accelerated deterioration test in the same manner as in Example 9, whereby the weight increase upon expiration of 552 hours was 1.2% by weight, and the effective life was 2,200 hours [as shown by curve ($b_4$) in FIG. 2].

EXAMPLE 13

One part by weight of a GdOBr:Ce phosphor was dipped in 10 parts by weight of a solution mixture comprising equal amounts of an aqueous solution containing 0.2 mol/liter of $Na_2HPO_4$, an aqueous solution containing 0.2 mol/liter of $KH_2PO_4$ and an aqueous solution containing 5 mol/liter of KF, and stirred at room temperature for 60 minutes. The mixture was filtered (the primary treatment for moisture resistance) to obtain a GdOBr:Ce phosphor. The phosphor was then immersed in 10 parts by weight of a methanol solution of cinnamic acid (a solution of 20% by weight), and stirred at room temperature for 10 minutes. Then, the phosphor was collected by filtration and left to dry at room temperature (the secondary treatment for moisture resistance).

Then, 0.2 part by weight of cinnamic acid was added and dissolved in a phosphor coating solution comprising 8 parts by weight of a GdOBr:Ce phosphor subjected to the primary and secondary treatments for moisture resistance as mentioned above, 1 part by weight of cellulose acetate butyrate and a solvent (a mixture of acetone, ethyl acetate and butyl acetate), and then the coating solution was applied onto a support made of a polyethylene terephthalate having a carbon black light-absorbing layer in such an amount that the thickness of the layer after drying would be about 30 $mg/cm_2$, followed by drying to form a fluorescent layer. Then, a transparent protective layer made of a polyethylene terephthalate film having a thickness of about 10 $\mu m$ was laminated on the fluorescent layer to obtain an intensifying screen 1.

Separately, an intensifying screen R1 (Comparative Example 1) was prepared in the same manner as the preparation of the intensifying screen 1 except that a GdOBr:Ce phosphor to which no primary or secondary treatment for moisture resistance as mentioned above was applied, was used as the phosphor and no cinnamic acid was incorporated in the phosphor coating solution, for the purpose of comparison.

The intensifying screen 1 and the intensifying screen R1 thus prepared were held in a constant temperature and constant humidity chamber at a temperature of 60° C. under a relative humidity of 80% for 30 days and 60 days, and the photographic speed was measured. As shown in Table 1, in the case of the intensifying screen R1 in which no cinnamic acid was incorporated in the fluorescent layer, the fluorescent layer absorbed moisture and decomposed by 30 days later, whereby it was impossible to measure the photographic speed. Whereas, in the case of the intensifying screen 1 in which cinnamic acid was incorporated in the fluorescent layer, the photographic speed upon expiration of 30 days and 60 days were 91 and 83, respectively, when the photographic speed immediately after the preparation was evaluated to be 100, thus indicating a remarkable improvement in the moisture resistance.

In the same manner as above, 16 types of intensifying screens (intensifying screens 2 to 13 and intensifying screens 2R to 5R) were prepared in which the compositions of the rare earth oxyhalide phosphors, the conditions for the moisture resistant treatments, the amounts of cinnamic acid added to the phosphor coating solutions and the amounts of cinnamic acid contained in the final fluorescent layers (which may contain a partially modified cinnamic acid, and which is, in any case, represented by weight percentage relative to the rare earth oxyhalide phosphors) were as identified in Table 1. These intensifying screens were held in a constant temperature and constant humidity chamber at a temperature of 60° C. under a relative humidity of 80% for 30 days and 60 days, and the photographic speeds of the respective intensifying screens were measured, and compared by relative values based on the photographic speed immediately after the preparation being evaluated as 100. The results are shown in Table 1. It is evident from Table 1 that among the intensifying screens wherein rare earth oxyhalide phosphors were employed, the intensifying screens wherein the fluorescent layers contained no cinnamic acid (intensifying screens 2R to 5R) were hygroscopic, and upon expiration of 30 days, the fluroscent layers absorbed moisture and decomposed, whereby it was impossible to measure the photographic speed. Whereas, the intensifying screens wherein the fluorescent layers contained cinnamic acid (intensifying screens 2 to 13) had remarkably improved moisture resistance and the deterioration of the photographic speed was suppressed.

TABLE 1

| Intensifying screen No. | Phosphor composition | Moisture resistant treatment of the phosphor | | Cinnamic acid (wt. %) | | Relative photographic speed | |
|---|---|---|---|---|---|---|---|
| | | (Note 1) Primary | (Note 2) Secondary | (Note 3) Added amount | (Note 4) Content | 30 days later | 60 days later |
| 1 | GdOBr:Ce | Yes | Yes | 2.5 | 6.5 | 91 | 83 |
| 2 | " | " | " | 0 | 4 | 81 | 71 |
| 3 | " | No | No | 2.5 | 2.5 | 20 | (Note 5) |
| R1 (Comparative) | " | " | " | 0 | 0 | (Note 5) | — |
| 4 | LaOBr:Tm | Yes | Yes | 3 | 6 | 95 | 90 |
| 5 | " | No | No | 3 | 3 | 88 | 80 |
| R2 (Comparative) | " | " | " | 0 | 0 | (Note 5) | — |
| 6 | LaOBr:Tb | Yes | Yes | 2 | 5 | 95 | 90 |
| 7 | " | No | No | 2 | 2 | 88 | 80 |
| R3 (Comparative) | " | " | " | 0 | 0 | (Note 5) | — |
| 8 | $(La_{0.5},Gd_{0.5})OBr:Ce$ | Yes | Yes | 3 | 5 | 95 | 86 |
| 9 | $(La_{0.5},Gd_{0.5})OBr:Ce$ | " | " | 0 | 3 | 80 | 68 |
| 10 | $(La_{0.5},Gd_{0.5})OBr:Ce$ | No | No | 5 | 5 | 79 | 70 |
| R4 (Comparative) | $(La_{0.5},Gd_{0.5})OBr:Ce$ | " | " | 0 | 0 | (Note 5) | — |
| 11 | $(Y_{0.5},Gd_{0.5})OBr:Ce$ | Yes | Yes | 4 | 8 | 86 | 74 |
| 12 | $(Y_{0.5},Gd_{0.5})OBr:Ce$ | " | " | 0 | 4 | 80 | 60 |
| 13 | $(Y_{0.5},Gd_{0.5})OBr:Ce$ | No | No | 4 | 4 | 75 | 30 |
| R5 (Comparative) | $(Y_{0.5},Gd_{0.5})OBr:Ce$ | " | " | 0 | 0 | (Note 5) | — |

(Note 1): Immersed in a solution mixture comprising an aqueous solution containing 0.2 mol/liter of $Na_2HPO_4$, an aqueous solution containing 0.2 mol/liter of $KH_2PO_4$ and an aqueous solution containing 5 mol/liter of KF.
(Note 2): Immersed in a methanol solution containing at least 20% by weight of cinnamic acid.
(Note 3): The amount of the cinnamic acid added to the phosphor coating solution.
(Note 4): The total amount of the cinnamic acid contained in the fluorescent layer of the intensifying screen thus prepared.
(Note 5): The fluorescent layer absorbs moisture and undergo decomposition, whereby it was impossible to measure the photographic speed.

EXAMPLE 14

Intensifying screens No. 14 and No. 15 were prepared in the substantially the same manner as in the case of No. 8 and No. 10 in Example 13 except that p-methylphenylacrylic acid was used instead of cinnamic acid and the coating amount for the layer was 44 mg/cm2. The relative photographic speed of the intensifying screen No. 14 containing p-methylphenylacrylic acid wherein the phosphor was subjected to moisture resistance treatment (primary treatment) was 100 upon expiration of 7 days. Likewise, the relative photographic speed of the intensifying screen No. 15 containing p-methylphenylacrylic acid wherein the phosphor was not subjected to moisture resistant treatment (primary or secondary) was also 100 upon expiration of 7 days.

We claim:

1. A rare earth phosphor composition, comprising: a rare earth oxyhalide phosphor body and cinnamic acid, which may have a hydrophobic substituent, said cinnamic acid being preliminarily adhered to said phosphor body or being dissolved in a coating solution containing said phosphor body thereby being admixed with said phosphor body upon drying of applied coating solution.

2. The rare earth phosphor composition according to claim 1, wherein said phosphor body is admixed with cinnamic acid as the ingredients are formulated in said coating solution.

3. The rare earth phosphor composition according to claim 1, wherein the particles of said phosphor body are pretreated with an aqueous solution containing at least one type of ion selected from the group consisting of fluorine ions, phosphate ions, carbonate ions and sulfate ions, and then said particles are combined with cinnamic acid.

4. The rare earth phosphor composition according to claim 3, wherein the concentration of the ions is within a range of from 0.001 mol/liter calculated as the concentration of the salt from which the ions are derived, to a level not greater than the solubility of the salt.

5. The rare earth phosphor composition according to claim 1, wherein the rare earth oxyhalide phosphor is a rare earth oxybromide phosphor.

6. The rare earth phosphor composition accroding to claim 1, wherein the rare earth oxyhalide phosphor is a gadolinium or lanthanum phosphor.

7. A radiographic image conversion screen, comprising:
    a support; and
    a fluorescent layer formed on the support which is composed essentially of a rare earth oxyhalide phosphor particles dispersed in a binder resin, said fluorescent layer further containing cinnamic acid which may have a hydrophobic substituent.

8. The radiographic image conversion screen according to claim 7, wherein the fluorescent layer contains a rare earth oxyhalide phosphor to which the cinnamic acid is preliminarily adhered.

9. The radiographic image conversion screen according to claim 7, wherein the binder resin in the fluorescent layer contains the cinnamic acid.

10. The radiographic image conversion screen according to claim 7, wherein the fluorescent layer comprises a rare earth oxyhalide phosphor to which the cinnamic acid is preliminarily adhered and a binder resin containing the cinnamic acid.

11. The radiographic image conversion screen according to claim 7, wherein the amount of the cinnamic acid is within a range of from 0.05 to 10% by weight based on the rare earth oxyhalide phosphor.

12. The radiographic image conversion screen according to claim 11, wherein the amount of the cinnamic acid is within a range of from 2 to 6% by weight based on the rare earth oxyhalide phosphor.

13. The radiographic image conversion screen according to claim 7, wherein the particles of the rare earth oxyhalide phosphor are preliminarily treated for moisture resistance.

14. The radiographic image conversion screen according to claim 7, wherein the binder resin is cellulose acetate butyrate or polyvinyl butyral.

* * * * *